United States Patent
Foster et al.

(10) Patent No.: US 9,249,917 B2
(45) Date of Patent: Feb. 2, 2016

(54) ACTIVE SEALING MEMBER

(71) Applicant: General Electric Company, Schenectady, NY (US)

(72) Inventors: Gregory Thomas Foster, Greer, SC (US); Dustin Michael Earnhardt, Greenville, SC (US); Michelle Jessica Rogers, Simpsonville, SC (US); David Wayne Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 13/893,520

(22) Filed: May 14, 2013

(65) Prior Publication Data

US 2014/0338772 A1 Nov. 20, 2014

(51) Int. Cl.
*F15D 1/02* (2006.01)
*F16L 55/16* (2006.01)
*F16L 55/11* (2006.01)

(52) U.S. Cl.
CPC ............. *F16L 55/1612* (2013.01); *F16L 55/11* (2013.01); *Y10T 29/49826* (2015.01)

(58) Field of Classification Search
USPC .......... 138/38, 39, 94, 42; 220/215, 801, 802, 220/361; 425/192 R
See application file for complete search history.

(56) References Cited

U.S. PATENT DOCUMENTS

| | | | | |
|---|---|---|---|---|
| 2,069,374 A | * | 2/1937 | Lagomarsino | 62/298 |
| 3,662,566 A | * | 5/1972 | Brand | 62/51.1 |
| 3,760,874 A | * | 9/1973 | Boskovic | 165/177 |
| 4,637,449 A | | 1/1987 | Mills et al. | |
| 5,232,343 A | * | 8/1993 | Butts | 416/97 R |
| 5,291,654 A | | 3/1994 | Judd et al. | |
| 5,957,657 A | * | 9/1999 | Akita et al. | 415/115 |
| 6,413,041 B1 | | 7/2002 | Sedillo | |
| 6,454,156 B1 | | 9/2002 | Taras, Jr. et al. | |
| 6,533,030 B2 | * | 3/2003 | Mitrovic et al. | 165/184 |
| 6,557,621 B1 | | 5/2003 | Dierksmeier et al. | |
| 7,647,945 B2 | * | 1/2010 | Finkel | 138/42 |
| 8,087,565 B2 | * | 1/2012 | Kottilingam et al. | 228/119 |
| 2010/0158701 A1 | * | 6/2010 | Khanin et al. | 416/97 R |
| 2011/0058957 A1 | | 3/2011 | Von Arx et al. | |
| 2012/0328451 A1 | * | 12/2012 | Lomas et al. | 416/97 R |

* cited by examiner

*Primary Examiner* — James Hook
(74) *Attorney, Agent, or Firm* — Ernest G. Cusick; Hoffman Warnick LLC (57) ABSTRACT

A sealing member, a component including a sealing member, and a method of sealing a hole are disclosed. In an embodiment, the sealing member includes a plug member for occluding a hole in a wall of a passageway. The plug member includes at least one cooling feature disposed on a distal end of the plug member exposed to the passageway.

20 Claims, 10 Drawing Sheets

ACTIVE SEALING MEMBER

BACKGROUND OF THE INVENTION

The disclosure relates generally to hot gas path components having cooling passageways cast therein, for use in turbomachines such as gas turbines. More particularly, the disclosure relates to an active sealing member for sealing cast-in holes in the cooling passageway walls.

Components in turbomachines such as gas turbines typically operate in high temperature environments. In order to efficiently cool the components, which may for example include nozzles, shrouds, and buckets, cooling passageways may be cast into the body of the components during fabrication. These cooling passageways allow a fluid to circulate through the cooling passageways, carrying energy in the form of heat away from the component.

The casting process for fabricating such components may result in the formation of components having holes in the walls of the cooling passageways. These holes may be sealed by, e.g., welding, brazing, threading, or other means, such as inserting a plug into or over the hole.

In embodiments in which the cooling passageways include features or geometries on an interior of the cooling passageway to increase heat transfer effectiveness and promote cooling, the plugged area of the cooling passageway wall typically lacks such cooling features. The plugged hole thus becomes a dead zone in the cooling circuit, and/or may interfere with the desired flow pattern for maximum cooling.

BRIEF DESCRIPTION OF THE INVENTION

A sealing member including a cooling feature, and a component including such a sealing member, and a method of sealing a hole in a cooling passageway are provided herein.

A first aspect of the disclosure provides a sealing member including a plug member for occluding a hole in a wall of a passageway. The plug member includes at least one cooling feature disposed on a distal end of the plug member exposed to the passageway.

A second aspect of the disclosure provides a hot gas path component having a component body and a cooling passageway disposed within the component body. The cooling passageway includes at least one hole in a wall thereof, and a sealing member for sealing the hole. The sealing member includes a plug member for occluding a hole in a wall of a passageway, the plug member including at least one cooling feature disposed on a distal end of the plug member exposed to the passageway.

A third aspect of the disclosure provides a method of sealing a hole in wall of a cooling passageway, the cooling passageway being disposed within a body of a component. The method includes inserting a sealing member into the hole, wherein the sealing member includes a plug member for occluding a hole in a wall of a passageway, the plug member including at least one cooling feature disposed on a distal end of the plug member exposed to the passageway.

These and other aspects, advantages and salient features of the invention will become apparent from the following detailed description, which, when taken in conjunction with the annexed drawings, where like parts are designated by like reference characters throughout the drawings, disclose embodiments of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

At least one embodiment of the present invention is described below in reference to its application in connection with the operation of turbomachine. Although embodiments of the invention are illustrated relative to a turbomachine in the form of a gas turbine, it is understood that the teachings are equally applicable to other types of turbomachines having components with cooling passageways disposed therein. Further, at least one embodiment of the present invention is described below in reference to a nominal size and including a set of nominal dimensions. However, it should be apparent to those skilled in the art that the present invention is likewise applicable to any suitable turbomachine. Further, it should be apparent to those skilled in the art that the present invention is likewise applicable to various scales of the nominal size and/or nominal dimensions.

As indicated above, aspects of the invention depicted in FIGS. 1-16 provide a sealing member 200 (FIGS. 7-16) and a component 100 (FIGS. 1-2, 4-9) that includes a sealing member 200.

With reference to FIGS. 1-2 and 4-9, a partial view of component 100 is shown. Component 100 may be any type of component having cooling passageways disposed therein, as is known in the art. In particular, component 100 may be a hot gas path component such as, e.g., a nozzle, a shroud, or a bucket for, e.g., a gas turbine.

Figure 4:
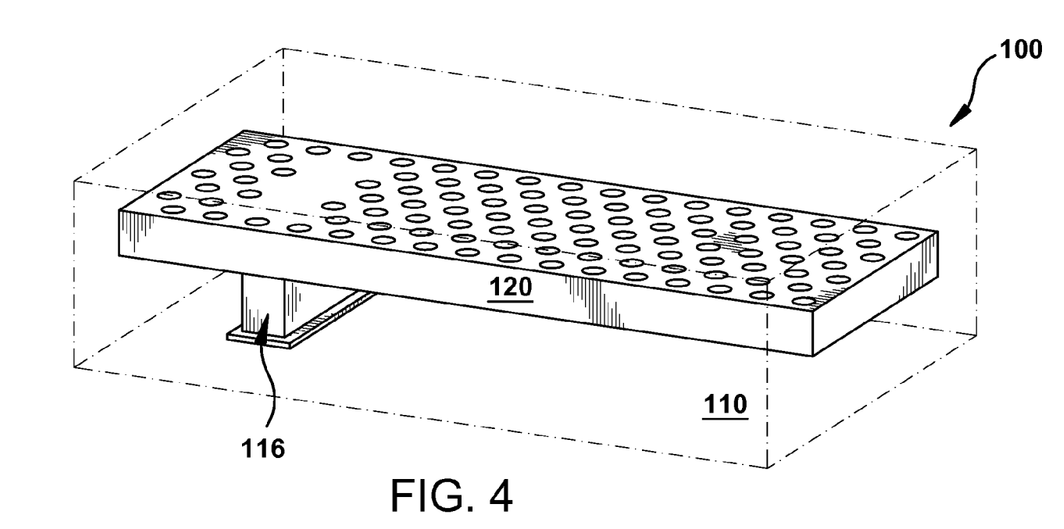
FIG. 4 shows an isometric view of a body of a component according to various embodiments of the disclosure.
Figure 5:
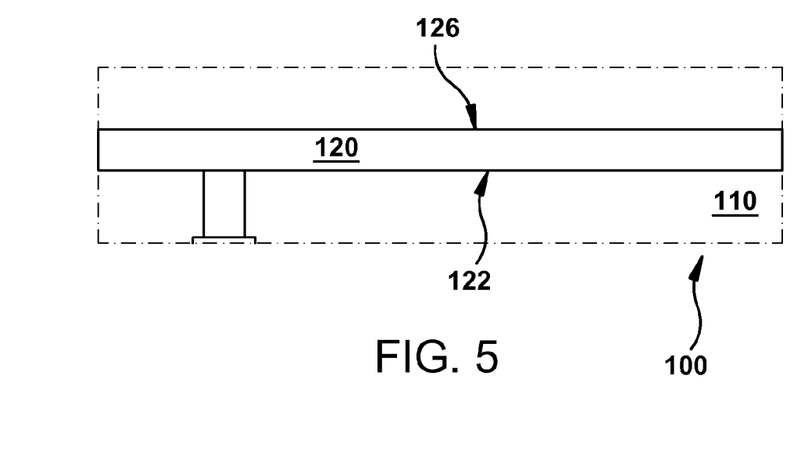
FIG. 5 shows a cross sectional side view of a body of a component according to various embodiments of the disclosure.
Figure 6:
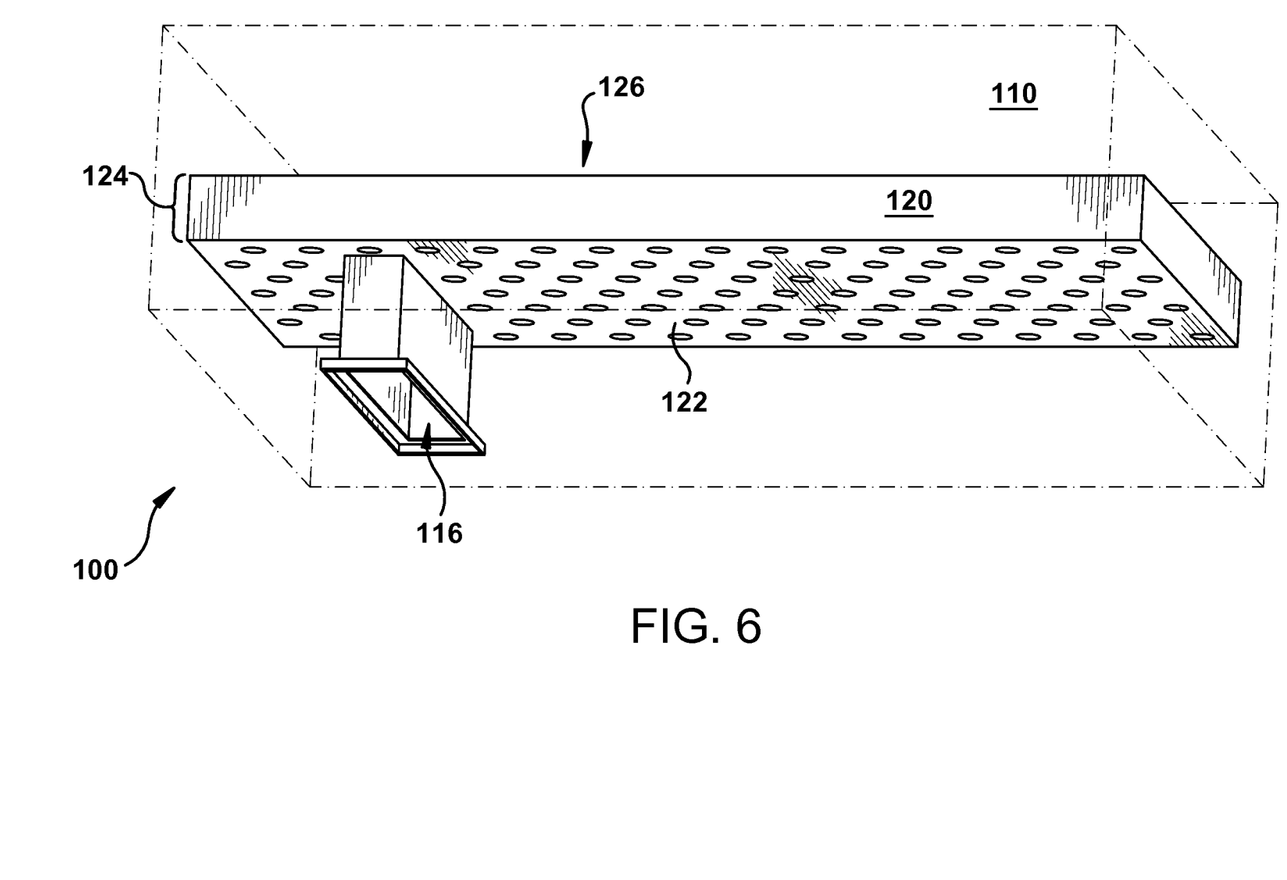
FIG. 6 shows an isometric view of a body of a component according to various embodiments of the disclosure.

Component 100 includes a body 110 with at least one cooling passageway 120 (FIGS. 4-9, 15-16) disposed within body 110. In various embodiments, cooling passageway 120 may pass through body 110 in any of a number of arrangements such as, e.g., a serpentine cooling passageway or a pin bank. For simplicity, the embodiments shown in FIGS. 4-6 depict a pin bank cooling passageway 120, but any arrangement of cooling passageways 120, including serpentine passageways and other passageway configurations may be used in various embodiments and are considered part of the disclosure.

Figure 1:
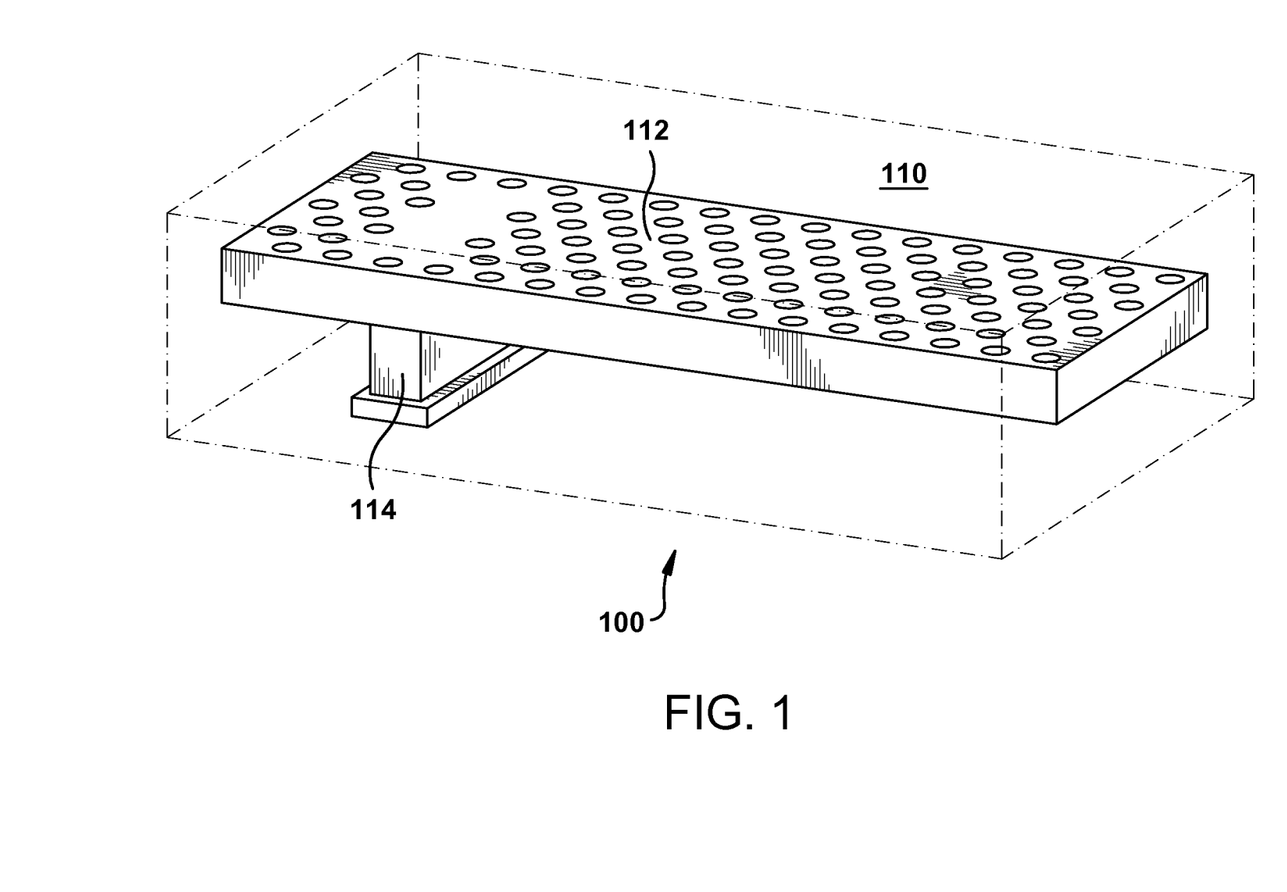
FIG. 1 shows an isometric view of a body of a component according to various embodiments of the disclosure.
Figure 2:
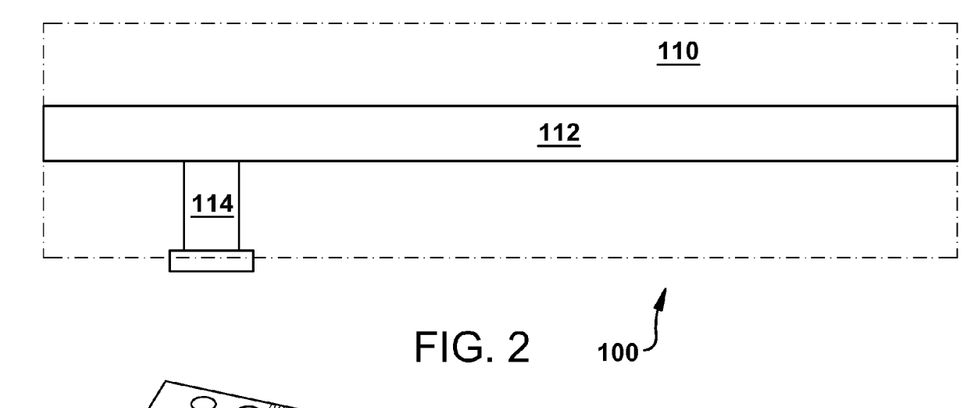
FIG. 2 shows a side view of a body of a component according to various embodiments of the disclosure.

Hollow cooling passageways 120 may be cast in component 100 by providing a core 112 (FIG. 3) made of, e.g., ceramic, within the component mold. As shown in FIGS. 1-2, core 112 may be retained within the mold (not pictured) by one or a plurality of extensions from the main body of core 112 called prints 114. Prints 114 may extend, for example, from the core 112 to an inner surface of the mold (not pictured), or from one core 112 to another core 112. Molten metal is then poured into the mold having the core 112 and prints 114 disposed therein. The presence of core 112 and prints 114 prevents the molten metal from flowing into the regions of the mold where the cores 112 and prints 114 are located.

After the metal solidifies to form body 110 (FIGS. 1-2), the cores 112 and prints 114 (FIG. 3) may be removed, e.g., by leaching out the material forming core 112 and prints 114. The leaching may be done by immersing body 110 in a chemical bath. This results in the formation of a void within the component body 110 where core 112 had been. This void forms a cooling passageway 120 as shown in FIGS. 4-6.

Figure 3:
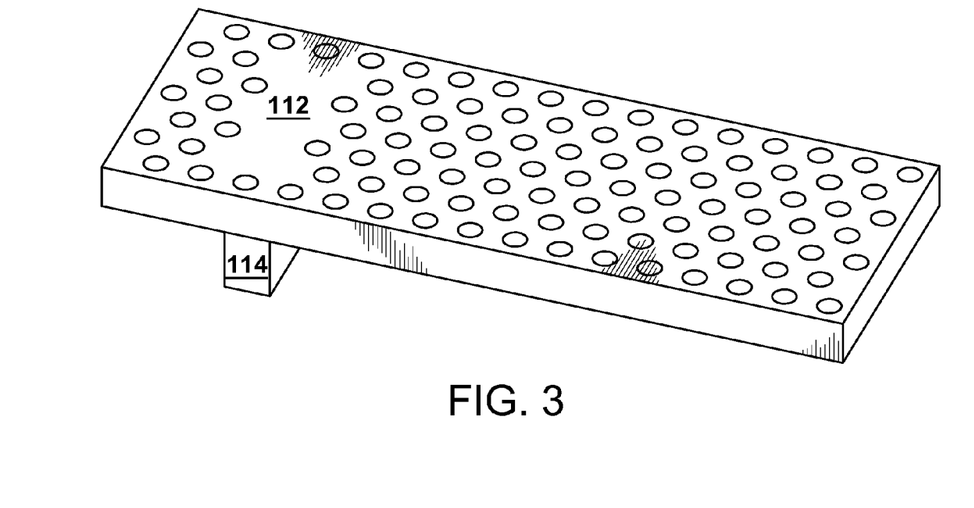
FIG. 3 shows an isometric view of a core in accordance with an embodiment of the disclosure.

Depending on the shape of the core 112 used to form the component, cooling passageway 120 may take any of numerous forms. In some embodiments, core 112 may be perforated as shown in FIG. 3, to facilitate the casting of a pin bank in cooling passageway 120 of the cast component 100 (see, e.g., FIGS. 8-9). In other embodiments, the core may be solid, so as to form a cooling passageway having smooth interior walls without any protuberances inside the cooling passageway. In other embodiments, the core may be shaped to form other cooling features on an interior of the cooling passageway as is known in the art.

The leaching process used to remove core 112 and prints 114 may further result in printout holes 116 in the walls of the cooling passageways 120, shown in FIGS. 4-6. Holes 116 may place cooling passageways 120 in fluid communication with an exterior of body 110, or may place one cooling passageway 120 in fluid communication with another cooling passageway 120 (not shown). Such fluid communication between cooling passageways 120 may short circuit the cooling pathway through body 110.

Figure 7:
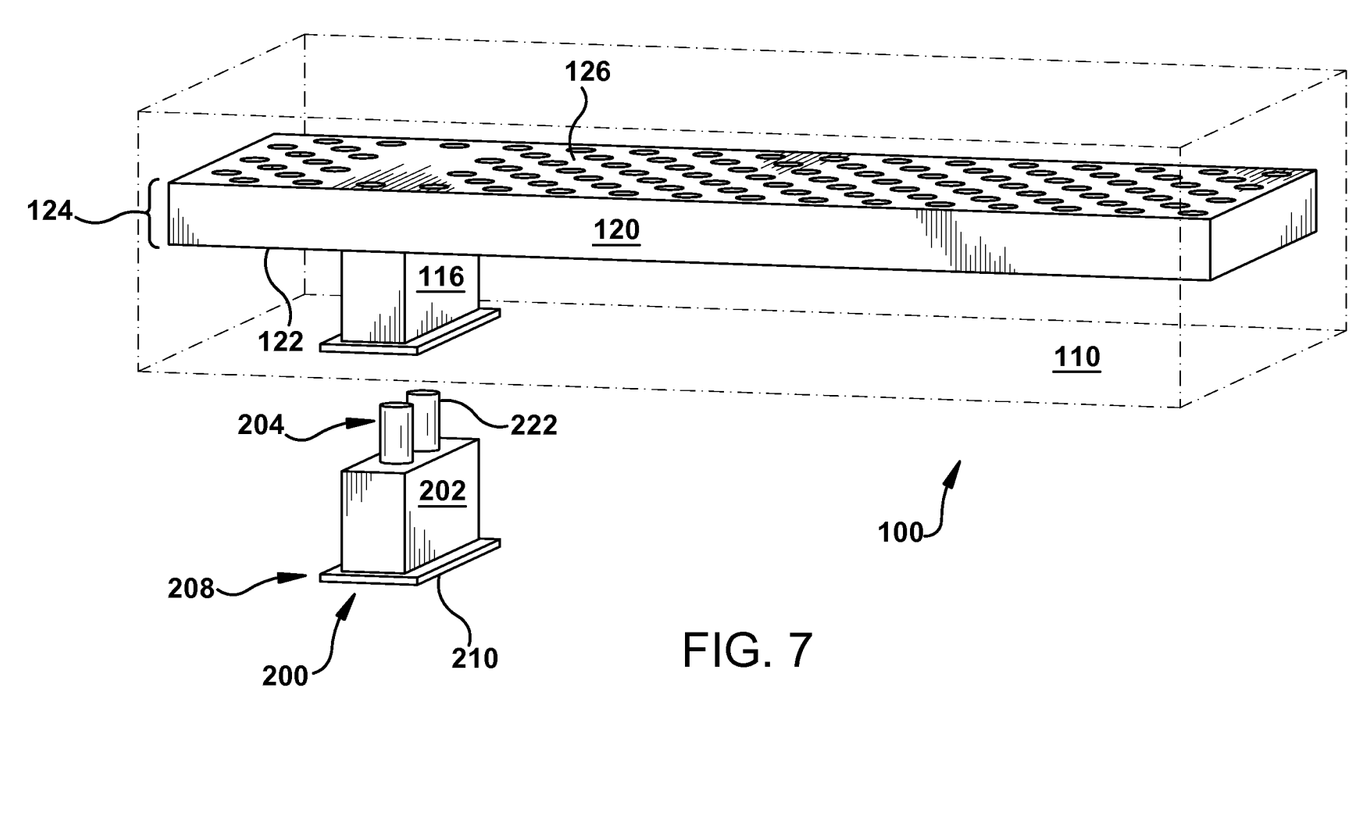
FIG. 7 shows an isometric view of a body of a component according to various embodiments of the disclosure.

As shown in FIG. 7, a sealing member 200 may be provided for occluding hole 116 in wall 122 of cooling passageway 120. As shown in greater detail in, e.g., FIGS. 10-16, sealing member 200 includes a plug member 202 for occluding a hole 116 (FIG. 7) in a wall 122 of a cooling passageway 120. Plug member 202 may include at least one cooling feature 204 disposed on a distal end 206 of the plug member 202. Distal end 206 of plug member 202 refers to the end of plug member 202 which is exposed to cooling passageway 120 as shown in FIGS. 8-9.

Referring to FIGS. 10-16, in some embodiments, plug member 202 may further include a depth stop 210, which may be disposed on a proximal end of plug member 202. Proximal end 208 of plug member 202 is opposite distal end 206, and refers to the end not directly exposed to cooling passageway 120 as shown in FIGS. 8-9. As shown in FIGS. 10-14, depth stop 210 may be in the form of, for example, a flange or similar feature having a dimension which exceeds a dimension of hole 116 (FIG. 7). Depth stop 210 may aid in positioning and orienting of sealing member 200 in hole 116 (FIG. 7) in some embodiments. In other embodiments, cooling feature 204 (discussed further below) or another locating feature on a distal end 206 of sealing member 200 or an opposing wall 126 of cooling passageway 120 may be used to locate and position sealing member 200 in hole 116.

Figure 8:
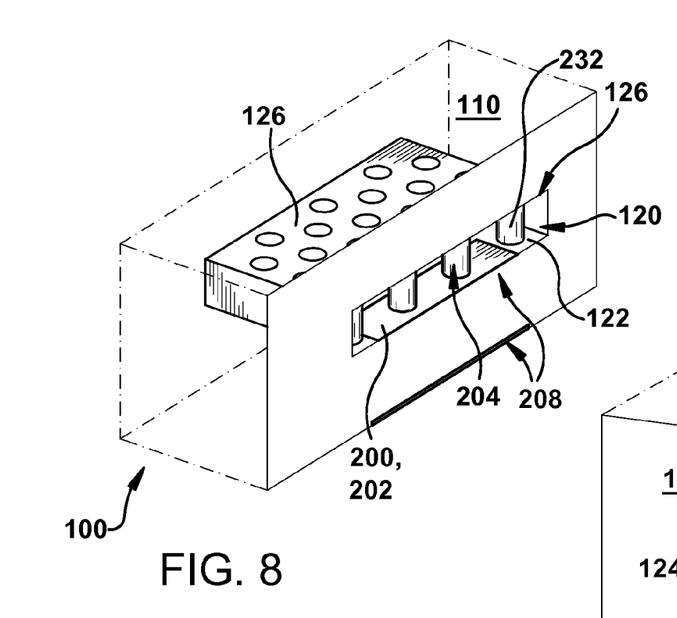
FIGS. 8-9 show cross sections of a body of a component including a sealing member according to various embodiments of the disclosure.
Figure 9:
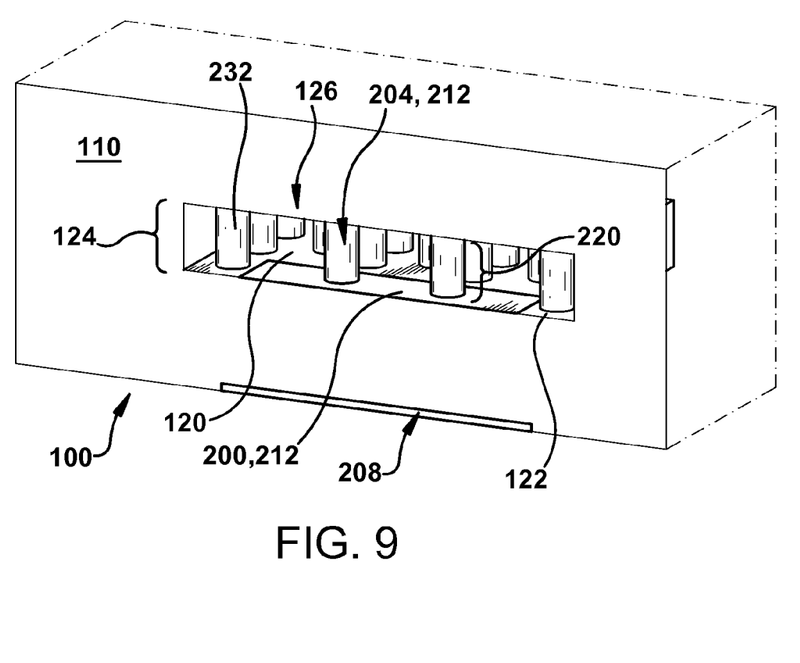

As further shown in FIGS. 8-9, at least a portion of cooling feature 204 may be disposed within the cooling passageway 120. In some embodiments of component 100, as discussed above, cooling passageway 120 may include at least one cooling feature 232 on an interior of the cooling passageway 120. In the embodiment of FIGS. 8-9, a plurality of cooling features 232 may be present in a pin bank formation. In such an embodiment, cooling features 232 on the interior of cooling passageway 120, together with cooling feature 204 on plug member 202, may form a substantially continuous cooling circuit through body 210 of the component 100. Cooling features 204 and 232 may actively enhance heat transfer and cooling of component 100.

Figure 10:
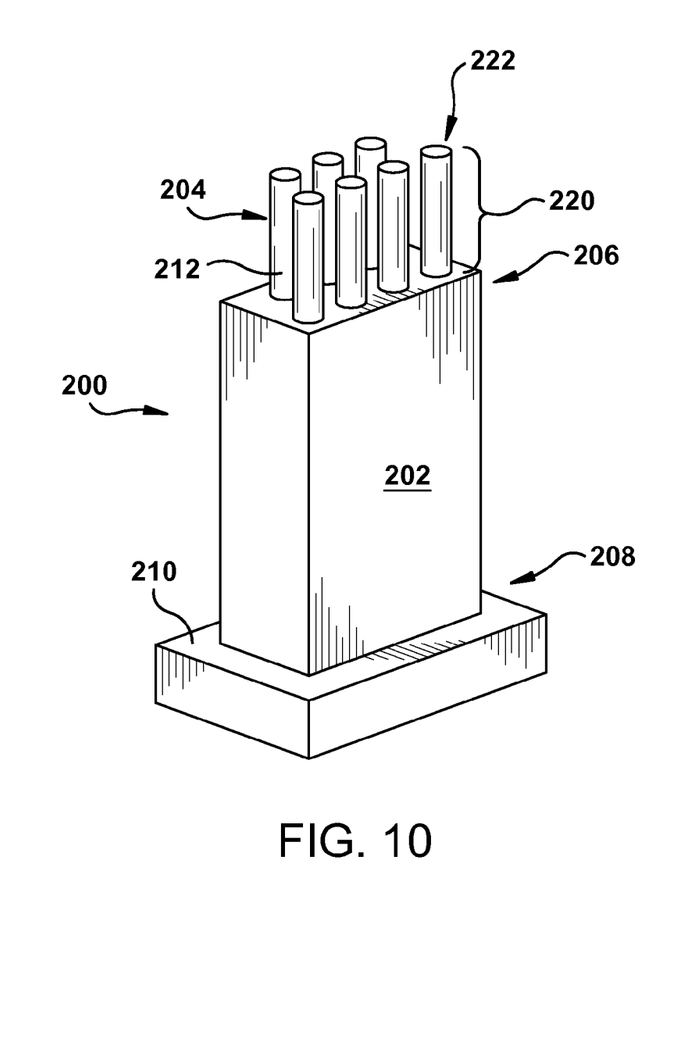
FIGS. 10-11 show isometric views of a sealing member in accordance with embodiments of the disclosure.

Cooling feature 204 may be any type of cooling geometry which may be utilized to enhance heat transfer effectiveness at the walls 122, 126 of cooling passageway 120. In various embodiments, cooling feature 204 on plug member 202 may take various forms. In one embodiment, as shown in FIG. 10, cooling feature 204 may include at least one element 212 extending distally from a distal end 206 of plug member 202. Any number of elements 212 may be present on distal end 206, depending on the cooling scheme and fluid flow path desired. In some embodiments, elements 212 may be substantially similar in size and dimension to cooling features 232 in cooling passageway 120, so that when sealing member 200 is inserted into hole 116 as shown in FIG. 9, elements 212 substantially continue a pattern of cooling elements 232 within cooling passageway 120. In FIGS. 9 and 10, two and seven elements 212 are shown, although these are merely two exemplary embodiments.

Figure 11:
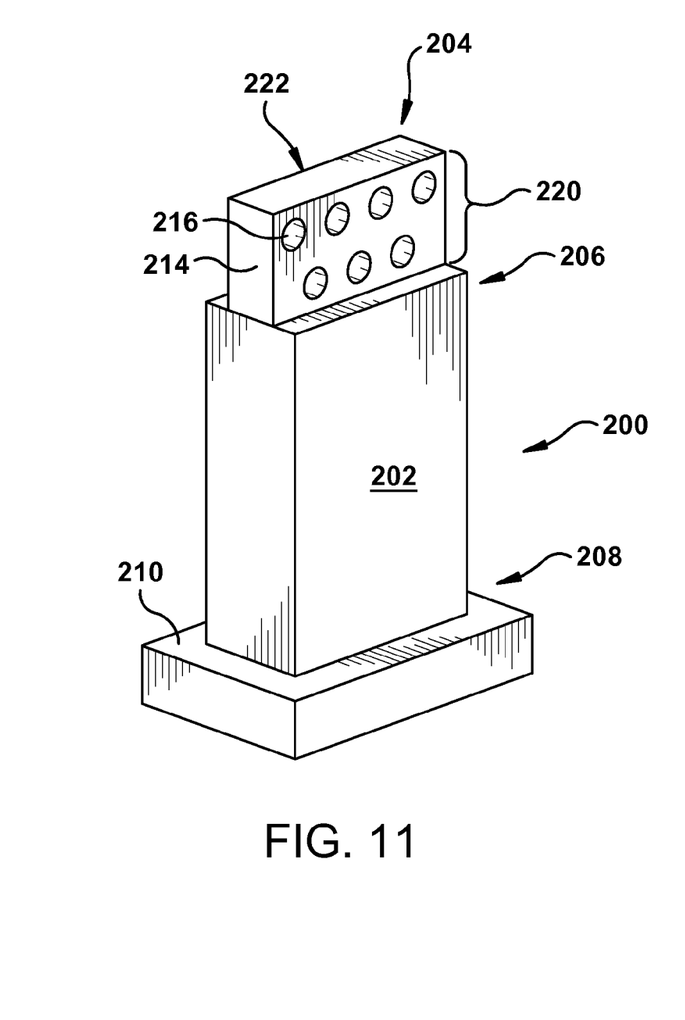

In another embodiment, as shown in FIG. 11, cooling feature 204 may include a distal portion 214 disposed on a distal end 206 of plug member 202, the distal portion 214 having at least one hole 216 there through. As with the embodiment of FIG. 10, any number, diameter, and arrangement of holes 216 may be used depending on the cooling scheme and flow path desired. In still other embodiments, shown in FIGS. 12-13, cooling feature 204 may include a turbulator member 218. Turbulator member 218 may be any feature which partially blocks or occludes cooling passageway 120, and disrupts or turbulates the fluid flow path there through. In some embodiments, turbulator member 218 may include one or more partial protrusions on distal end 206 of plug member 202, and may function similarly to a speed bump within cooling passageway 120. In various other embodiments, turbulator member 218 may have any of a number of different shapes and/or orientations.

Figure 14:
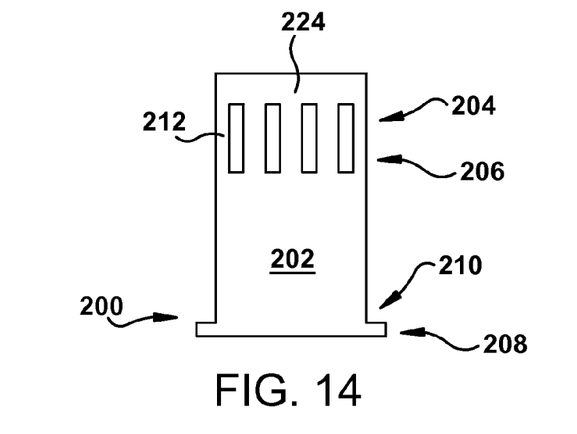

In a further embodiment, shown in FIG. 14, cooling feature 204 may include at least one element 212 extending distally from a distal end 206 of plug member 202. As in FIG. 10, any number of elements 212 may be present on distal end 206, depending on the cooling scheme and fluid flow path desired. At a distal end of the group of elements 212, a sealing surface 224 may be provided. Sealing surface 224 may be a substantially continuous surface having a surface area at least as large as a surface area defined by the distal ends of elements 212.

Figure 15:
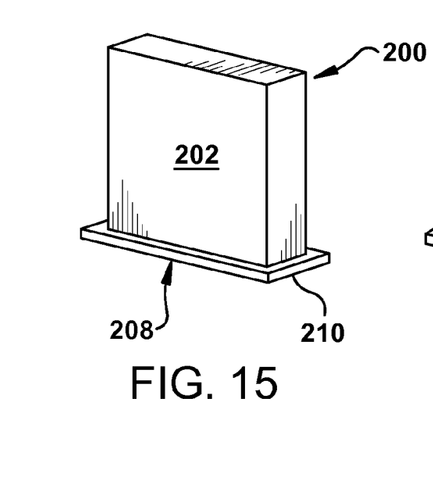
FIGS. 15-16 show isometric views of a sealing member in accordance with embodiments of the disclosure.
Figure 16:
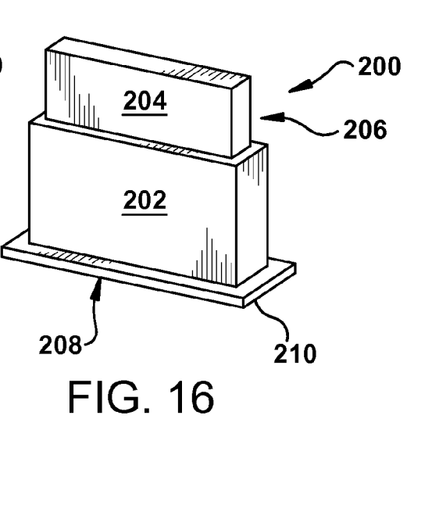
Figures 17, 18:
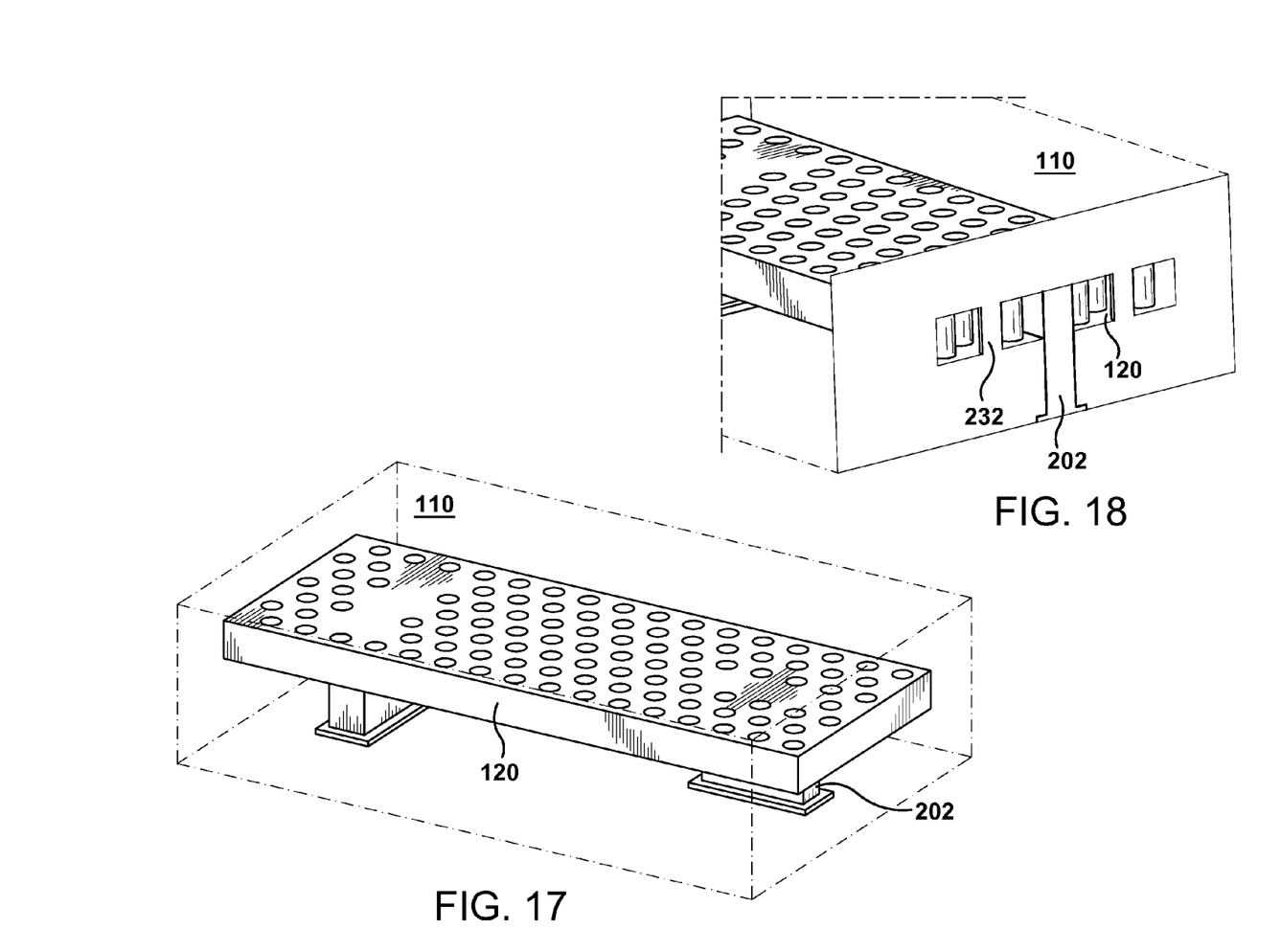
FIG. 17. shows an isometric view of a body of a component according to various embodiments of the disclosure.
FIG. 18 shows a cross sectional view of a body of a component including a sealing member according to an embodiment of the disclosure.

In FIGS. 15 and 16, plug member 202 is substantially solid. FIG. 15 shows a plug member 202 having a substantially constant thickness, while FIG. 16 shows a plug member 202 having a cooling feature 204 at a distal end 206 of plug member 202 which has a lesser thickness. As shown in FIGS. 17-18, the plug member 202 of each of FIGS. 15-16 may be used to divide the fluid flow through the cooling passage 120 into which it is inserted and/or guide the fluid flow in a particular path, which may facilitate maximal cooling such as, e.g., via features present on an interior of cooling passageway 120.

Referring back to FIGS. 7 and 9, in one embodiment, cooling feature 204 may have a length 220 (FIG. 9) substantially the same as a width 124 of cooling passageway 120. In such an embodiment, distal end 222 (FIG. 7) of cooling feature 204 may contact an opposing wall 126 of cooling passageway 120 from a position of the hole 116. Where this embodiment is combined with the embodiment of FIG. 10, in which cooling feature 204 is a distally extending element 212, for example, this may create a continuous pin or pedestal. Where cooling feature 204 includes sealing surface 224 (FIG. 14), sealing surface 224 may be sealed to opposing wall 126.

Figure 19:
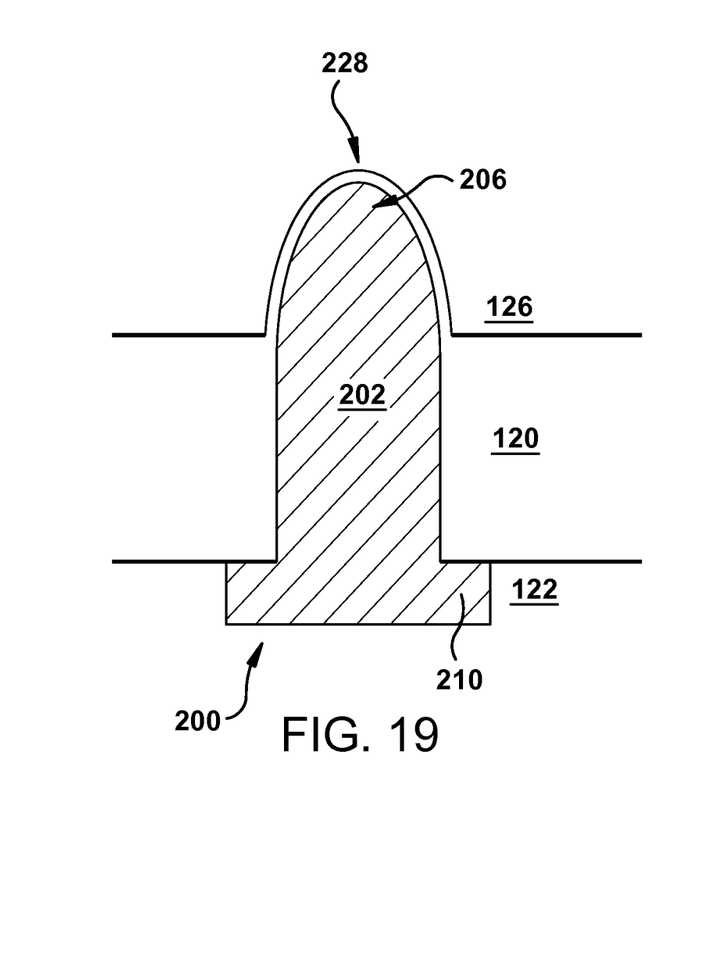
FIGS. 19-20 show cross sectional views of aspects of a sealing member inserted into a body of a component in accordance with embodiments of the disclosure.

In some embodiments, as shown in FIG. 19, cooling passageways 120 may be cast as described above using cores having features protruding from an exterior surface of the core, resulting in cooling passageways 120 having indented features 228. In such an embodiment, distal end 206 of plug member 202 may have a substantially convexly curved shape which may matingly engage with indented feature 228 of opposing wall 126, i.e., distal end 206 of plug member 202 may extend into an indented feature 228 in opposing wall 126.

Figure 20:
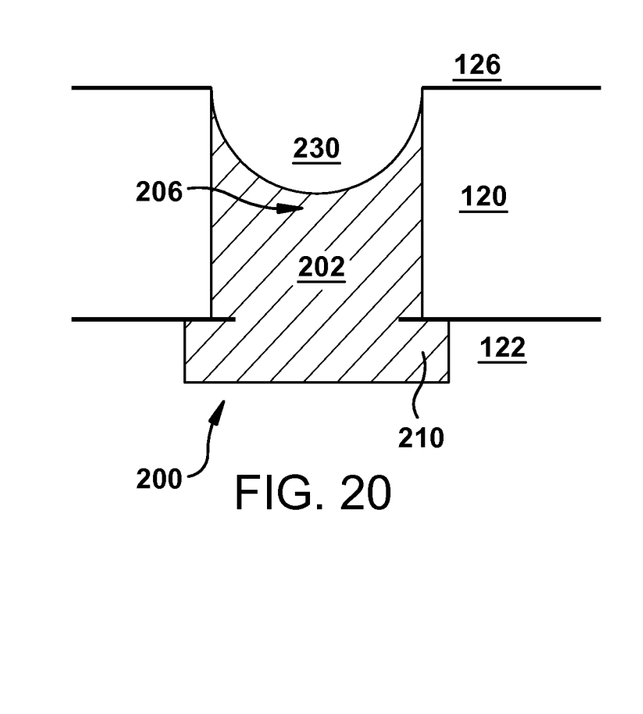

In other embodiments, as shown in FIG. 20, cooling passageways 120 may be cast as described above using cores having indented features or dimples on the core exterior, resulting in the casting of cooling passageways 120 having protruding features 230. Protruding features 230 may be substantially rounded or convexly curved in some embodiments. As shown in FIG. 20, distal end 206 of plug member 202 have a concavely curved surface which may matingly engage with protruding feature 230 of opposing wall 126, i.e., protruding feature 230 of opposing wall 126 may extend radially inward into cooling passageway 120. With respect to FIGS. 19 and 20 in particular, features such as indented feature 228 and protruding feature 230 may serve to assist in locating and properly positioning distal end 206 of plug member 202 once it has been inserted into hole 116, and for orienting sealing member 200 to properly seal hole 116 (FIG. 6) and orient cooling features 204. Indented feature 228 and protruding feature 230 may also increase the bonding surface area to allow for a stronger joint.

Once positioned in hole 116, sealing member 200 may be affixed in any of a number of ways, including brazing or use of an adhesive between sealing member 200 and one or both of wall 122 or 126. In some embodiments, distal end 206 of sealing member 200 may be brazed or adhered to opposing wall 126 of cooling passageway 120. In other embodiments, depth stop 210 may be brazed or adhered to wall 122 of cooling passageway.

Figures 12, 13:
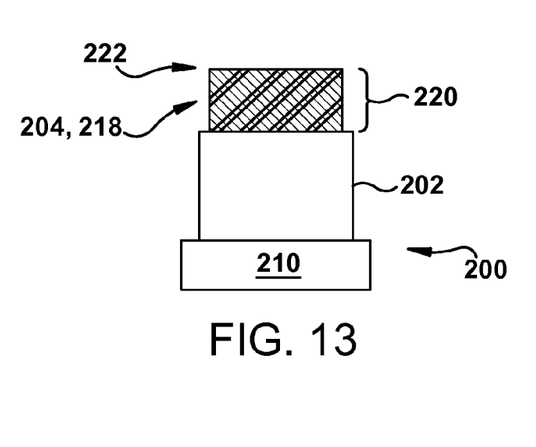
FIGS. 12-14 shows cross sectional views of aspects of a sealing member in accordance with embodiments of the disclosure.
Figure 12:
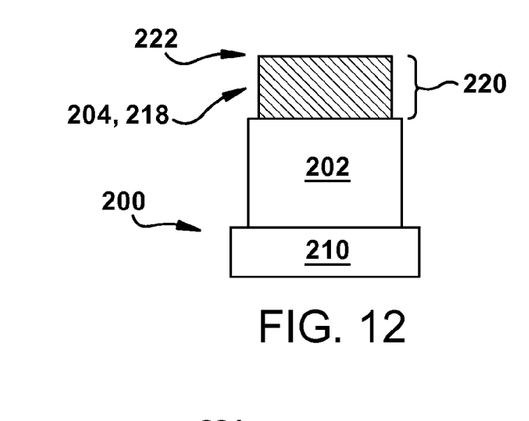

In another embodiment, a method is provided for sealing a hole 116 in a wall 122 of a cooling passageway 120. As depicted in the transition from FIG. 7 to FIGS. 8-9, the method includes inserting a sealing member 200 into the hole 116 (FIG. 7). As shown in FIG. 7, and in greater detail in FIGS. 10-14, sealing member 200 may include plug member 202 for occluding hole 116 in a wall 122 of a cooling passageway 120. Plug member 202 may further include at least one cooling feature 204 disposed on a distal end 206 of the plug member 202 exposed to the cooling passageway 120. The sealing member 200 may be inserted such that at least a portion of cooling feature(s) 204 is/are disposed within the cooling passageway 120. As discussed above, cooling feature 204 may include any type of cooling geometry which may be utilized to enhance heat transfer effectiveness at the walls 122, 126 of cooling passageway 120, including but not limited to at least one element 212 extending distally from a distal end 206 of the plug member 202, either with or without a sealing surface 224 at a distal end thereof (FIG. 10, 14); a distal portion 214 disposed on a distal end 206 of the plug member 202, the distal portion 214 having at least one hole 216 there through (FIG. 11); or a turbulator member 218 (FIGS. 12-13).

As further described above with respect to FIGS. 7-9, in some embodiments, the method may include inserting sealing member 200 into hole 116 to a depth at which distal end 222 of cooling feature 204 contacts an opposing wall 126 of cooling passageway 120 relative to a position of the hole 116. In such embodiments, cooling feature 204 may have a length 220 substantially the same as a width 124 of cooling passageway 120. In further embodiments, the method may also include brazing, adhering, or otherwise affixing distal end 206 of plug member 202 to opposing wall 126 of cooling passageway 120, or proximal end 208, which may include depth stop 210, to wall 122 of cooling passageway 120 as previously described.

In further embodiments, cooling passageway 120 may include at least one cooling feature 232 disposed on an interior thereof. As described above, the insertion of sealing member 200 into hole 116 in such a component 100 may form a substantially continuous cooling circuit, having substantially continuous cooling geometries.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A sealing member comprising:
a plug member for occluding a hole in a wall of a passageway, the passageway including at least one geometric passageway cooling feature, the plug member including at least one geometric plug cooling feature disposed on a distal end of the plug member exposed to the passageway, the at least one geometric plug cooling feature substantially similar in size and dimension to the at least one geometric passageway cooling feature.

2. The sealing member of claim 1, further comprising a depth stop disposed on a proximal end of the plug member.

3. The sealing member of claim 1, wherein at least a portion of the at least one geometric plug cooling feature is disposed within the passageway.

4. The sealing member of claim 1, wherein the at least one geometric plug cooling feature includes a turbulator member.

5. The sealing member of claim 1, wherein the at least one geometric plug cooling feature includes a distal portion disposed on a distal end of the plug member, the distal portion having at least one hole there through.

6. The sealing member of claim 1, wherein the at least one geometric plug cooling feature includes at least one element extending distally from a distal end of the plug member.

7. The sealing member of claim 6, wherein at least one plug member has a length substantially the same as a width of the passageway, such that a distal end of the plug member contacts an opposing wall of the passageway from a position of the hole.

8. The sealing member of claim 1, wherein a distal end of the sealing member matingly engages with an opposing wall of the passageway from a position of the hole.

9. A hot gas path component comprising:
    a component body;
    a cooling passageway disposed within the component body, the cooling passageway including at least one geometric passageway cooling feature and having at least one hole in a wall thereof; and
    a sealing member for sealing the hole, the sealing member including:
    a plug member for occluding a hole in a wall of a passageway, the plug member including at least one geometric plug cooling feature disposed on a distal end of the plug member exposed to the passageway, the at least one geometric plug cooling feature substantially similar in size and dimension to the at least one geometric passageway cooling feature.

10. The hot gas path component of claim 9, wherein the hot gas path component includes one of a nozzle, a shroud, or a bucket.

11. The hot gas path component of claim 9, further comprising a depth stop disposed on a proximal end of the plug member.

12. The hot gas path component of claim 9, wherein at least a portion of the at least one geometric plug cooling feature is disposed within the passageway.

13. The hot gas path component of claim 9, wherein the at least one geometric plug cooling feature is one of:
    a turbulator member;
    a distal portion disposed on a distal end of the plug member, the distal portion having at least one hole there through; or
    at least one element extending distally from a distal end of the plug member.

14. The hot gas path component of claim 13, wherein at least one plug member has a length substantially the same as a width of the passageway, such that a distal end of the plug member contacts an opposing wall of the passageway from a position of the hole.

15. The hot gas path component of claim 9, wherein the at least one geometric passageway cooling feature is disposed on an interior of the cooling passageway.

16. The hot gas path component of claim 15, wherein the at least one geometric passageway cooling feature and the at least one geometric plug cooling feature on the sealing member form a substantially continuous cooling circuit through the body of the hot gas path component.

17. The hot gas path component of claim 9, wherein a distal end of the sealing member matingly engages with an opposing wall of the passageway from a position of the hole.

18. A method of sealing a hole in wall of a cooling passageway, the cooling passageway being disposed within a body of a component and including at least one geometric passageway cooling feature, the method comprising:
    inserting a sealing member into the hole,
    wherein the sealing member includes a plug member for occluding a hole in a wall of a passageway,
    the plug member including at least one geometric plug cooling feature disposed on a distal end of the plug member exposed to the passageway, the at least one plug cooling feature substantially similar in size and dimension to the at least one passageway cooling feature.

19. The method of claim 18, wherein at least a portion of the at least one geometric plug cooling feature is disposed within the passageway, and wherein the at least one cooling feature is one of:
    a turbulator member;
    a distal portion disposed on a distal end of the plug member, the distal portion having at least one hole there through; or
    at least one element extending distally from a distal end of the plug member.

20. The method of claim 18, wherein the at least one geometric passageway cooling feature is disposed on an interior of the cooling passageway, and
    wherein the at least one geometric passageway cooling feature on the interior of the cooling passageway and the at least one geometric plug cooling feature on the sealing member form a substantially continuous cooling circuit.

* * * * *